United States Patent Office 2,843,563
Patented July 15, 1958

2,843,563
POLYETHYLENE COMPOSITIONS STABILIZED WITH ACYL DERIVATIVES OF 1,2,4-TRIHYDROXYBENZENE

Alan Bell, M B Knowles, and Clarence E. Tholstrup, Kingsport, Tenn., assignors to Eastman Kodak Company, Rochester, N. Y., a corporation of New Jersey No Drawing. Application January 27, 1955
Serial No. 484,589

8 Claims. (Cl. 260—45.95)

This application is a continuation-in-part of our copending applications 302,412 filed August 2, 1952, now U. S. Patent 2,759,828, and Serial No. 441,153 filed July 2, 1954, which disclose the stabilization of fats, oils, waxes, greases, fuels, plastic compositions, synthetic resins, etc. with certain —CO—R derivatives of 1,2,4-trihydroxybenzene wherein R is defined below.

The invention described in this application relates to the use of these novel compounds as antioxidants for the stabilization of compositions of matter which contain a substantial proportion of polyethylene.

It is an object of our invention to provide stabilized polyethylene compositions containing an antioxidant which preserves the desirable electrical properties and other physical and chemical properties of the polyethylene. Other objects will become apparent hereinafter.

In accordance with our invention, a polyethylene composition can be prepared which contains from about 0.001 to about 1.0% by weight of an antioxidant selected from those having the following formula:

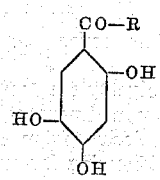

wherein R represents a member selected from the group consisting of an H atom, an alkyl radical containing from 1 to 20 carbon atoms, an alicyclic radical containing from 6 to 20 carbon atoms, an alkenyl radical containing from 2 to 20 carbon atoms, an aryl radical containing from 6 to 20 carbon atoms (including monocyclic and dicyclic aralkyl and alkaryl radicals) and a furyl radical. The position of the —CO—R substituent on the benzene ring as shown in the above formula is not known with complete certainty. However, the means for preparing these antioxidant compounds is clearly disclosed in the earlier applications referred to hereinabove. These earlier applications give numerous examples of compounds which come within the scope of the above formula and describe how these compounds can be advantageously prepared and employed for various purposes.

It is known that 1,2,4-trihydroxybenzene can be employed for the stabilization of certain organic materials. There is, however, no suggestion in the prior art that derivatives of this compound would also be useful as antioxidants for similar purposes. We have discovered that the introduction of the group, —CO—R (wherein R is defined above) on the benzene ring of 1,2,4-trihydroxybenzene results in the formation of compounds which have surprisingly superior antioxidant properties. This was wholly unexpected since the introduction of —CO—R substituents on the nucleus of hydroquinone gives compounds with very little antioxidant value. In our copending application 302,412 (referred to above), data has been presented relating to the effect of the introduction on the nucleus of hydroquinone of a —CO—R radical, particularly as regards the effectiveness of the resulting compound as an antioxidant for a specific organic material (namely, lard). This data clearly emphasizes the remarkable superiority of the compounds containing three hydroxy substituents in the 1,2,4-positions as compared to those of hydroquinone having only two substituents in the 1,4-positions.

The introduction of the —CO—R substituent into the nucleus of 1,2,4-trihydroxybenzene gives products which have many advantages as antioxidants over 1,2,4-trihydroxybenzene itself. Thus, the compounds of antioxidant value described in this invention are stable to air, are less water-soluble and are generally more potent antioxidants than 1,2,4-trihydroxybenzene.

When employed as antioxidants for polyethylene compositions, only a very small quantity of the antioxidant is ordinarily required. As little as 0.001% may be used and somewhat more than 1% can also be employed. However, it is ordinarily advantageous to employ from about 0.01 to about 1.0% by weight of the antioxidant based on the weight of the polyethylene composition. Ordinarily, 0.1% can be advantageously employed. Our invention also contemplates the addition of other additives along with the antioxidants of this invention. These additional additives can be employed for their synergistic effects or for their supplementary effects for other purposes. Other antioxidants which can be employed along with those of the present invention include tertiary butylated-p-hydroxyanisole, tertiary butylated-p-hydroxytoluene, etc.

The polyethylene with which our invention is concerned is a hydrocarbon polymer of considerable commercial importance as a thermoplastic molding and coating material. One of its most important advantages is its high dielectric strength coupled with repellent properties against water and water vapor. This enables articles coated or impregnated with polyethylene to retain their dielectrical properties for considerable periods of time. Some of the properties of polyethylene are described in vol. 17 of "British Plastics," pages 94–98, 146–151 and 208–228.

Unfortunately, polyethylene is subject to attack by atmospheric oxygen particularly at elevated temperatures, and when even slightly oxidized it suffers reduction in its desirable electrical properties. The present invention provides a means whereby this deterioration of electrical properties can be prevented. The stabilized polyethylene compositions of this invention retain their excellent electrical properties to a remarkable degree and they suffer practically no change in color.

The antioxidants of this invention can not only be employed for stabilizing relatively pure polyethylene but they can also be employed in stabilizing compositions which contain a substantial proportion of polyethylene. Numerous patents have been issued in recent years which describe compositions comprising polyethylene and paraffin wax which are especially suitable for use as coating compositions such as in the preparation of sheets of waxed paper, paper board, fabric, etc. The ratio of polyethylene to wax can be varied to a considerable extent depending upon the properties sought in the ultimate product. The waxed sheets can be employed for wrapping edible products including crackers, butter, margarine, salted nuts, bread, etc. Heavier waxed sheets can also be employed in the manufacture of cartons for milk, cottage cheese, and various other products. Waxed paper or paper board can also be employed in the manufacture of electrical insulators of various types. It is not believed necessary or desirable to further list the vast varieties of uses to which polyethylene and polyethylene compositions can be put.

Although the advantages of incorporating an antioxidant into a polyethylene composition appear especially advantageous when the composition is to be employed for electrical insulation or for wrapping edible products containing fats or oils, it is believed equally obvious that there are many other advantages in employing the antioxidants of this invention in the stabilization of polyethylene compositions.

By substantial proportion of polyethylene in the polyethylene compositions with which this invention is concerned, we intend to include a proportion of about 10% by weight of polyethylene or more. Besides consisting of combinations of polyethylene and paraffin wax, the polyethylene compositions referred to herein can also contain other polymerized olefins (e. g. polyisobutylene) or other waxes in minor proportions as well as additional antioxidants or other additives as mentioned above.

Our copending application Serial No. 441,153 contains a disclosure and presents claims relating to the stabilization of paraffin wax with some of the antioxidants of this invention. The present application pertains to the stabilization of polyethylene compositions which contain up to 90% paraffin wax or other related additives or ingredients.

The following examples will serve to further illustrate our invention. These examples refer to the employment of various commercial grades of polyethylene which are now available and can be purchased on the open market. The various grades of polyethylene are designed to provide properties most suitable for the particular purpose for which the ultimate product is to be employed. These grades of Alkathene polyethylene are defined in the series of articles in "British Plastics," pp. 94–98, 146–151, and 208–228 vol. 17 (1945). These articles also reveal many of the uses to which polyethylene can be advantageously put.

Examples

An antioxidant concentrate was prepared for use as a master batch in preparing stabilized polyethylene compositions. This master batch was made by milling 10% by weight of the antioxidant with Alkathene polyethylene grade 7.

Two grams of the master batch was mixed with 198 g. of Alkathene grade 2 polyethylene resulting in an antioxidant concentration of 0.1% by weight. This concentration was also varied as desired by changing the ratio of master batch to grade 2 polyethylene. The resulting mixture was then placed on rolls at a temperature of 160° C. and milled for 3 hours. Upon completion of the milling, the crepe was removed and a sample taken for molding. Sample moldings were also prepared from the polyethylene material as received without milling. Samples of the milled polyethylene crepe as prepared above were pressed into slabs of about 0.10-inch thickness. After aging at 23° C. for 48 hours, discs of about 2½ inches in diameter were punched out. Electrical contact with the surface of the discs was made by laminating 2-inch diameter discs of ½-mil thick tin foil on both sides of the specimen. All discs were again aged before testing. The dielectric properties were determined on the Boonton Radio Corporation type 160A Q-Meter. All tests were made using the General Radio dielectric sample holder. The determinations were made at 23° C. and at a frequency of 45 megacycles. A minimum of six specimens was tested from each sample and the results shown represent averages. The results are shown below:

| Antioxidant | Weight Percent | Dielectric Constant | Dissipation Factor |
|---|---|---|---|
| None | | 2.34 | 0.00247 |
| 2, 4, 5-Trihydroxybutyrophenone | 0.01 | 2.35 | 0.00083 |
| Do | 0.05 | 2.35 | 0.00062 |
| Do | 0.10 | 2.36 | 0.00054 |
| 2, 4, 5-Trihydroxycaprylophenone | 0.01 | 2.35 | 0.00087 |
| Do | 0.05 | 2.35 | 0.00061 |
| Do | 0.10 | 2.35 | 0.00048 |
| 2, 4, 5-Trihydroxystearophenone | 0.01 | 2.35 | 0.00095 |
| Do | 0.05 | 2.35 | 0.00068 |
| Do | 0.10 | 2.35 | 0.00058 |
| 2, 4, 5-Trihydroxybenzophenone | 0.01 | 2.35 | 0.00081 |
| Do | 0.05 | 2.35 | 0.00061 |
| Do | 0.10 | 2.35 | 0.00052 |

As can be seen from the above results, the dissipation factor of polyethylene is vastly improved when representative antioxidants of this invention are incorporated. In addition the color of the milled product is much lighter indicating that little oxidative deterioration has taken place.

In addition to the employment of the specific compounds mentioned in the preceding examples any of the other compounds coming within the scope of the general formula presented above can also be employed. Examples of compounds which can be so employed include: 2,4,5-trihydroxybenzaldehyde, 2,4,5-trihydroxypropionophenone, 2,4,5-trihydroxyvalerophenone, 2,4,5-trihydroxyphenyl furyl ketone, 2,4,5-trihydroxy-α-ethylbutyrophenone, 2,4,5-trihydroxyoleophenone, 2,4,5-trihydroxy-α-ethylcaprophenone, 2,4,5-trihydroxyphenyl omega-phenyl-n-decyl ketone, 2,4,5-trihydroxyphenyl xylyl ketone, 2,4,5-trihydroxyphenyl propenyl ketone, 2,4,5-trihydroxyphenyl allyl ketone, 2,4,5-trihydroxy-α-phenylacetophenone, 2,4,5-trihydroxyphenyl cyclohexyl ketone, 2,4,5-trihydroxyphenyl phenyl ketone, etc.

Moreover, it is readily apparent from the above examples and from our copending application 441,153 that the antioxidants described herein can be employed for the stabilization of polyethylene compositions which contain any desired proportions of paraffin wax or other ingredients as discussed hereinabove.

We claim:

1. A stabilized polyethylene composition containing from about 0.001 to about 1 percent by weight of an antioxidant compound selected from the group consisting of those having the following formula:

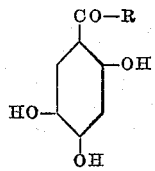

wherein R represents a member selected from the group consisting of an H atom, an alkyl radical containing from 1 to 20 carbon atoms, an alicyclic radical containing from 6 to 20 carbon atoms, an alkenyl radical containing from 2 to 20 carbon atoms, an aromatic radical containing from 6 to 20 carbon atoms and a furyl radical.

2. A stabilized polyethylene composition as defined in claim 1 wherein the antioxidant compound is 2,4,5-trihydroxybutyrophenone.

3. A stabilized polyethylene composition as defined in claim 1 wherein the antioxidant compound is 2,4,5-trihydroxycaprylophenone.

4. A stabilized polyethylene composition as defined in claim 1 wherein the antioxidant compound is 2,4,5-trihydroxystearophenone.

5. A stabilized polyethylene composition as defined in claim 1 wherein the antioxidant compound is 2,4,5-trihydroxybenzophenone.

6. A stabilized polyethylene composition as defined in claim 1 wherein the antioxidant compound is 2,4,5-trihydroxyphenyl furyl ketone.

7. A polyethylene composition normally subject to oxidative deteroriation which possesses improved heat stability at elevated temperatures comprising (A) polyethylene and (B) from about 0.001% to about 1 percent by weight of an antioxidant compound selected from the group consisting of those having the following formula:

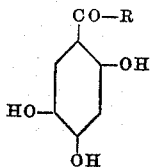

wherein R represents a member selected from the group consisting of an H atom, an alkyl radical containing from 1 to 20 carbon atoms, an alicyclic radical containing from 6 to 20 carbon atoms, an alkenyl radical containing from 2 to 20 carbon atoms, an aromatic radical containing from 6 to 20 carbon atoms and a furyl radical, which polyethylene composition is characterized by the fact that a reduced electrical dissipation factor and low discoloration are achieved when polyethylene containing one of said antioxidant compounds is milled for three hours at 160° C.

8. A polyethylene composition as defined in claim 7 wherein R represents a butyl radical.

References Cited in the file of this patent

UNITED STATES PATENTS

| | | |
|---|---|---|
| 2,034,024 | Clarke | Mar. 17, 1936 |
| 2,657,983 | Hill et al. | Nov. 3, 1953 |